Nov. 24, 1959     W. E. STAGEBERG     2,913,966
MANUFACTURE OF BAGS
Original Filed Nov. 26, 1954     2 Sheets-Sheet 1
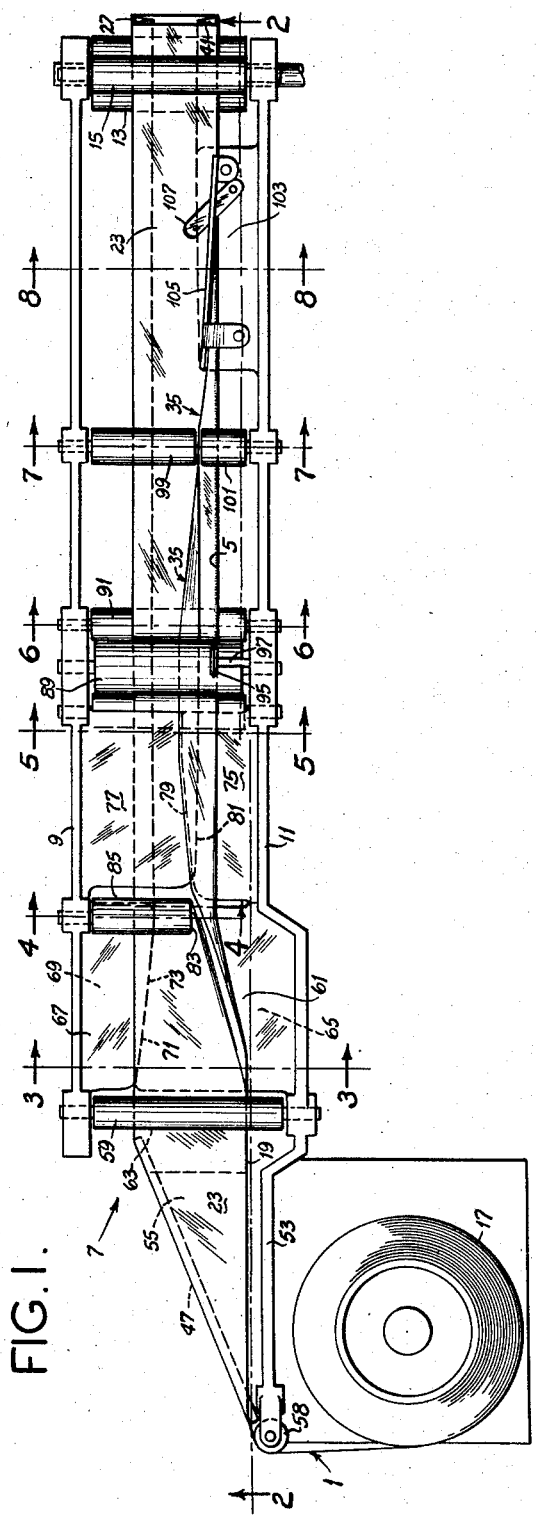
Wilfred E. Stageberg,
Inventor.
Koenig and Pope,
Attorneys.

Nov. 24, 1959 — W. E. STAGEBERG — 2,913,966
MANUFACTURE OF BAGS
Original Filed Nov. 26, 1954 — 2 Sheets-Sheet 2
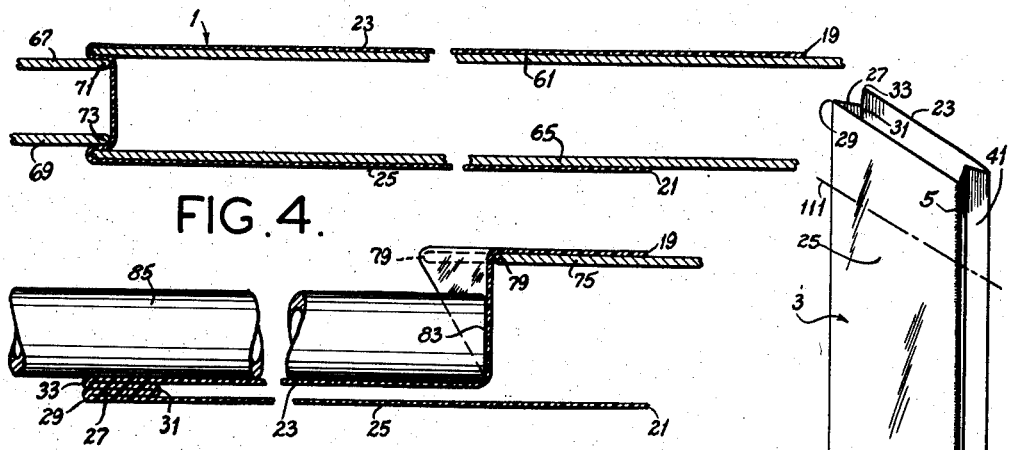
FIG. 3.
FIG. 4.
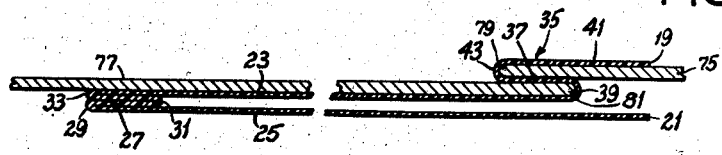
FIG. 5.
FIG. 9.
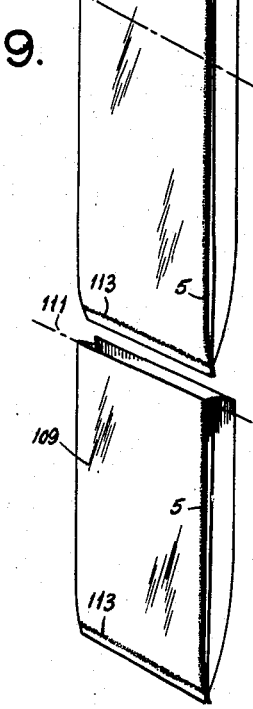
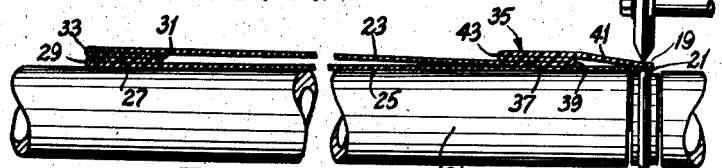
FIG. 6.
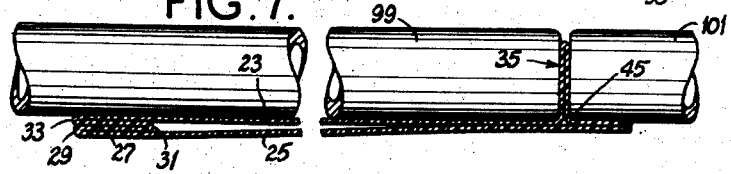
FIG. 7.
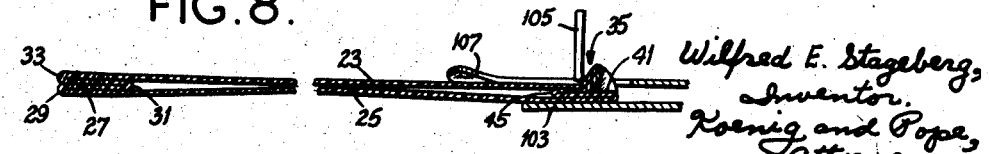
FIG. 8.
Wilfred E. Stageberg,
Inventor.
Koenig and Pope,
Attorneys.

United States Patent Office 2,913,966
Patented Nov. 24, 1959

2,913,966

MANUFACTURE OF BAGS

Wilfred E. Stageberg, Minneapolis, Minn., assignor to Bemis Bro. Bag Company, St. Louis, Mo., a corporation of Missouri Original application November 26, 1954, Serial No. 471,462. Divided and this application September 30, 1955, Serial No. 537,632

8 Claims. (Cl. 93—20)

This invention relates to the manufacture of gusseted bags from heat-sealable sheet plastic material, such as polyethylene, and more particularly to methods of and apparatus for the manufacture of gusseted tubing from which such bags may be made.

This application is a division of my co-pending application entitled Bags, Serial No. 471,462, filed November 26, 1954, now abandoned.

Heretofore, bags of the class described have been made from gusseted tubing formed with a heat-sealed seam between overlapping margins of the sheet material with the seam disposed generally centrally of one wall of the tubing. This makes it impracticable to have any printing on the seamed wall of the tubing, and also results in the undesirable presence of a loose flap of the sheet material extending throughout the length of the seamed wall of the tubing. Among the several objects of this invention may be noted the provision of a method and apparatus for forming a continuous web of heat-sealable sheet plastic material, such as polyethylene, into continuous gusseted tubing with a longitudinal tube seam along one edge of the tubing, rather than generally centrally of one wall of the tubing, thereby making it practical to have printing on both walls of the tubing and eliminating the stated undesirable flap; the provision of a method and apparatus of the class described which enables the continuous production of gusseted tubing of the type specified; and the provision of a method and apparatus of the class described enabling the economical production of tubing of the type specified. Other objects and features will be in part apparent and in part pointed out hereinafter.

The invention accordingly comprises the constructions and methods hereinafter described, the scope of the invention being indicated in the following claims.

In the accompanying drawings, in which one of various possible embodiments of the invention is illustrated, Fig. 1 is a plan view of an apparatus of this invention;

Fig. 2 is a vertical longitudinal cross section of the apparatus, taken on line 2—2 of Fig. 1;

Figs. 3–8 are enlarged vertical transverse cross sections, partly broken away, taken on lines 3—3 to 8—8, respectively, of Fig. 1; and Fig. 9 is a perspective illustrating the tubing produced by the method and apparatus of this invention, and showing how the tubing may be formed into bags.

Corresponding reference characters indicate corresponding parts throughout the several views of the drawings.

Referring to the drawings, Figs. 1–8 illustrate the formation in accordance with this invention of a continuous web 1 of heat-sealable sheet material, such as polyethylene, into the gusseted bag tubing indicated at 3 in Fig. 9, the tubing having a heat-sealed longitudinal seam 5 at one edge. Referring more particularly to Figs. 1 and 2, the formation of the web into the tubing is shown to be carried out in a tuber of this invention designated in its entirety by reference character 7. The tuber comprises a pair of side frames 9 and 11. Extending between the side frames at the forward end of the tuber (its right end as viewed in Figs. 1 and 2) are draw rolls 13 and 15. These are adapted to draw the web 1 from a supply roll 17 of the web material and to feed the web continuously through the tuber. The supply roll 17 is mounted in vertical position adjacent the rearward end of the tuber. As the web is continuously fed forward through the tuber, a series of operations is performed on the web by means to be described to form it into the tubing 3, the finished tubing 3 entering the draw rolls and being fed forward thereby for subsequent operations.

The first operation on the web 1 as it unwinds from the supply roll 17 is the folding of the web on lines extending longitudinally of the web and located intermediate the side edges 19 and 21 of the web to form it into a doubled web having walls 23 and 25 joined by a gusset 27 along one side of the doubled web. The web is shown in its flat condition as it unwinds from the supply roll 17 at the left end of Fig. 2. Fig. 3 shows the web in transition to the doubled web condition prior to the completion of the formation of the gusset 27, and Fig. 4 shows the doubled web with the gusset 27 completely formed. In the transition, the web, which unwinds from the supply roll in a vertical plane, is so folded that the doubled web is horizontal, with wall 23 of the doubled web constituting the upper wall and wall 25 the lower wall.

The lines on which the web is folded to form the doubled web are designated 29, 31 and 33 (see Figs. 4–9). These lines are so located that the width of the wall 25 is slightly greater than the desired final width for the tubing 3 and the width of the wall 23 is greater than the width of the wall 25 by a distance sufficient to provide a second gusset at the other side of the doubled web from the gusset 27. This distance is preferably slightly greater than twice the desired gusset width. This allows for some trimming off during a subsequent heat-sealing operation to be described.

The second operation on the web involves the disposition of a portion of the wall 23 of the doubled web to draw the edge 19 of the wall 23 into line or at least substantially into line with the edge 21 of the wall 25 with the side margins of the walls adjacent these edges in face-to-face contact. As shown best in Figs. 4–6, this is accomplished by forming a portion of wall 23 into a pleat generally designated 35, this pleat being folded inward and overlying the wall 23. The pleat 35 is formed by folding a portion 37 of the wall 23 inward on a longitudinal line 39 to overlie the wall 23, and folding a portion 41 of the wall 23 between portion 37 and the edge 19 of wall 23 outward on a longitudinal line 43 to overlie the portion 37 and to extend outward beyond portion 37 to the edge 21 of wall 25. Line 39 is located inward from the edge 21 of wall 25 a distance corresponding to the desired gusset panel width, and is spaced from the edge 19 of wall 23 (considering wall 23 as if it were flat) a distance corresponding to three times the desired gusset panel width, taking into account the slight excess of material allowed for trimming. Line 43 is spaced from the edge 19 of wall 23 (and from the edge 21 of wall 25) a distance corresponding to twice the desired gusset panel width, again taking into account the slight excess of material allowed for trimming. The pleat 35 is constituted by portion 37 and the overlying part of portion 41.

The third operation on the web is the heat-sealing of the side margins of the walls 23 and 25 adjacent their edges 19 and 21 to form the seam 5 with accompanying trimming off of the excess material. This is accomplished by applying heat and pressure to the side margins with the doubled web in the condition shown in Fig. 6, wherein the side margins are accessible for application of heat and pressure from above and below, the pleat 35 being folded inward so as not to overlie the side margins.

Finally, the pleat 35 is folded outward on line 39 to overlie the marginal portions of walls 23 and 25 which lie outward of the line 39. In this operation the portion 41 of the wall 23 (which has a width corresponding to twice the desired gusset panel width) is folded in half on a line 45 coincident with line 39 to form the second gusset, this second gusset being designated by the reference character 41 since it is constituted by the folded portion 41. The transition of the pleat 35 from its inwardly folded to its outwardly folded position to form the second gusset 41 is illustrated in Figs. 6–8.

For carrying out the operation of doubling the web 1 and forming the first gusset 27, the tuber 7 comprises vertically arranged upper and lower triangular horns 47 and 49 with a space 51 between the horns. The side frame 11 has a rearward extension 53 beyond the rearward end of side frame 9, and the horns are mounted on this extension. The upper horn has an upper triangular face 55 inclined downward in forward direction. The lower horn has a lower triangular face 57 inclined upward in forward direction. The web 1 unwinding from the supply roll 17 travels around a vertical guide roll 58 at the rearward end of frame extension 53, and thence over the horns. The horns initiate the doubling of the web.

The upper wall of the partially doubled web leaving the horns is guided under an upper horizontal guide roll 59 and thence over an upper inside former blade 61, and the lower wall of the partially doubled web is guided over a lower guide roll 63 and thence under a lower inside former blade 65. Rolls 59 and 63 are located in a vertical plane at the rearward end of side frame 9. Blades 61 and 65 are mounted on side frame 11, extending as cantilevers toward side frame 9. Blade 61 is inclined downward and blade 65 is inclined upward in forward direction, converging toward their forward ends so that the doubled web is flattened. The gusset 27 is formed by upper and lower intucking blades 67 and 69 mounted on side frame 9 and extending as cantilevers toward side frame 11. Blade 67 extends under the upper inside former blade 61 and is inclined downward like blade 61. Blade 69 extends over the lower inside former blade 65 and is inclined upward like blade 65. The planes of blades 67 and 69 converge in forward direction. Each of blades 67 and 69 has an inside intucking edge which is angled toward the side frame 11 in forward direction. The intucking edge of blade 67 is designated 71, and the intucking edge of blade 69 is designated 73 (see Fig. 3). The overlap of blades 61, 67 and 65, 69 at their forward ends corresponds to the desired gusset width.

The formation of the pleat 35 is carried out by means of upper and lower pleating blades 75 and 77 forward of the inside former blades and the intucking blades. The upper pleating blade 75 is mounted on side frame 11 and extends as a cantilever toward side frame 9. Its plane is slightly inclined upward in forward direction (see Fig. 2). It has an inner edge 79 which angles toward the side frame 9 in forward direction. The lower pleating blade is mounted on the side frame 9 and extends as a cantilever toward the side frame 11. Its plane is inclined upward in forward direction at a greater angle than blade 75. The planes of blades 75 and 77 converge in forward direction. Blade 77 has an inner end edge 81 which is generally parallel to the side frames. The folding on line 39 occurs on this edge 81.

A right side portion of the upper wall 23 of the doubled web formed by the horns and the former blades and intucking blades is folded up against the free end 83 of a cantilever guide roll 85 projecting from side frame 9 toward side frame 11 and outward around the inner edge of the upper pleating blade 75 to intitiate the formation of the pleat 35. Roll 85 is located between the forward end of the former blades and the rearward end of the pleating blades. The doubled web having the gusset 27 issuing from the former blade travels under the roll 85, which completes the flattening of the doubled web. The convergence of the planes of the pleating blades and the divergence of the inner edges 79 and 81 of the pleating blades in forward direction form the pleat 35 with the pleat folded inward as shown in Figs. 5 and 6.

The doubled and pleated web issuing from the pleating blades travels over a guide roll 87 (which completes the flattening of the pleat), under a lower guide roll 89, thence up and forward around a roll 91. As the web travels over the roll 91, the side margins of the walls 23 and 25 are heat-sealed adjacent their edges 19 and 21 to form the seam 5 by means of a pair of heated sealing rolls 93 and 95. Roll 93 is shown as coaxial with roll 91 (see Fig. 6) and roll 95 is mounted on a shaft 97 extending from the side frame 11. It will be understood that the sealing rolls may be heated as by means of electrical resistance heating elements incorporated therein. The sealing rolls are preferably such as to form a fine seam and to trim off excess material outward of the seam.

As the web travels from the rolls 93, 95 to the draw rolls 13 and 15, the pleat 35 is folded over from its inward position to form the gusset 41. This is accomplished by guiding the pleat between the adjacent ends of two coaxial cantilever rolls 99 and 101 (see Figs. 1 and 7) to turn the pleat from its Fig. 6 position to the vertical position shown in Fig. 7, then over a table 103, along a folding blade 105 and under a spring presser foot 107. This completes the formation of the tubing 3 with the heat-sealed seam 5 along the fold of gusset 41 at the juncture of wall 25 and the gusset 41.

Fig. 9 shows the tubing 3 being segmented to form bags such as the bag indicated at 109 by transversely severing the tubing on lines indicated at 111 and heat sealing the resultant bag lengths on transverse lines indicated at 113 to form bottom closures for the bag lengths.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

I claim:

1. The method of forming gusseted tubing from a web of heat-sealable sheet material, comprising continuously feeding the web, folding the web on lines extending longitudinally of the web and located intermediate the side edges of the web to form it into a doubled web having walls joined by a gusset along one side of the doubled web, said lines being so located that one wall is wider than the other in amount sufficient to provie a second gusset, folding said wider wall to draw its edge back from the edge of the other wall and to bring said edges substantially into alignment with the side margins of the walls in face-to-face contact and also to form gusset-forming portions one of which includes said side margins and the other of which is folded away from said side edges on the outside of the wider wall to lie away from said side margins so that they are clear for heat sealing, heat sealing said side margins, and then folding said other gusset-forming portion outward to form the second gusset along the other side of the doubled and heat-sealed web.

2. The method of forming gusseted tubing from a web of heat-sealable sheet material, comprising continuously feeding the web, folding the web on lines extending longitudinally of the web and located intermediate the side edges of the web to form it into a doubled web having walls joined by a gusset along one side of the doubled web, said lines being so located that one wall is wider than the other in amount sufficient to provide a second gusset, forming a pleat in the wider wall to draw its edge back from the edge of the other wall and to bring said edges substantially into alignment with the side margins of the walls in face-to-face contact, the pleat being folded away from said side edges and lying flat on the outside of said wider wall to lie away from said side margins so that they are clear for heat sealing, heat sealing said side margins, and then folding the pleat outward to form the second gusset along the other side of the doubled and heat-sealed web.

3. The method of forming gusseted tubing from a web of heat-sealable sheet material, comprising continuously feeding the web, folding the web on lines extending longitudinally of the web and located intermediate the side edges of the web to form it into a doubled web having walls joined by a gusset along one side of the doubled web, said lines being so located that one wall is wider than the other a distance corresponding to twice the gusset panel width, forming a pleat in the wider wall to draw its edge back from the edge of the other wall and to bring said edges substantially into alignment with the side margins of the walls in face-to-face contact, said pleat being formed by folding the wider wall inward on a line spaced from the edge of said wider wall a distance corresponding to three times the gusset panel width and folding the wider wall outward on a line spaced from the edge of said wider wall a distance corresponding to twice the gusset panel width, the pleat thereby lying flat on the outside of the wider wall away from said side margins so that they are clear for heat sealing, heat sealing said side margins, and then folding the pleat outward to form a second gusset along the other side of the doubled and heat-sealed web.

4. A tuber having former and intucking blades for forming a web of heat-sealable sheet material into a doubled web having walls joined by a gusset along one side of the doubled web with one of said walls wider than the other in amount sufficient to form a second gusset along the other side of the doubled web, means for folding the wider wall to draw its edge back from the edge of the other wall and to bring said edges substantially into alignment with the side margins of the walls in face-to-face contact and also to form gusset-forming portions one of which includes said side margins and the other of which is folded away from said side edges on the outside of the wider wall to lie away from said side margins so that they are clear for heat sealing, means for heat-sealing the walls along said edges, and means for folding said other gusset-forming portion outward to form the second gusset along the other side of the doubled and heat-sealed web.

5. A tuber having former and intucking blades for forming a web of heat-sealable sheet material into a doubled web having walls joined by a gusset along one side of the doubled web with one of said walls wider than the other in amount sufficient to form a second gusset along the other side of the doubled web, means for forming a pleat in the wider wall to bring its edge substantially into line with the edge of the other wall and to bring the side margins of the walls into fact-to-face contact, said means forming the pleat to lie away from said side margins, means for heat-sealing the walls along said edges, and means for folding over the pleat to form the second gusset along the other side of the doubled and heat-sealed web.

6. A tuber having former and intucking blades for forming a web of heat-sealable sheet material into a doubled web having walls joined by a gusset along one side of the doubled web with one of said walls wider than the other in amount sufficient to form a second gusset along the other side of the doubled web, a pair of blades for forming a pleat in the wider wall to bring its edge substantially into line with the edge of the other wall and to bring the side margins of the walls into face-to-face contact, said blades being arranged to form the pleat in an inwardly folded position adjacent said edges, means for heat-sealing the walls along said edges, and means for folding over the pleat to an outwardly folded position thereby to form the second gusset along the other side of the doubled and heat-sealed web.

7. A tuber comprising a pair of side frames, means for forming a web of heat-sealable sheet material into a doubled web having walls joined by a gusset along one side of the doubled web with one of said walls wider than the other in amount sufficient to form a second gusset along the other side of the doubled web, said means comprising a pair of horns for initiating doubling of the web, a pair of inside former blades extending from one side frame toward the other and a pair of intucking blades extending from said other toward said one side frame, means for forming a pleat in the wider wall to bring its edge substantially into line with the edge of the other wall and to bring the side margins of the walls into face-to-face contact comprising a pleating blade extending from one side frame toward the other and a pleating blade extending from said other toward said one side frame, said blades forming the pleat in an inwardly folded position adjacent said edges, a pair of heat-sealing rolls for heat sealing the walls along said edges, and means for folding over the pleat to an outwardly folded position thereby to form the second gusset along the other side of the doubled and heat-sealed web.

8. The method of forming a gusset at one margin of first and second superposed continuous layers of flexible heat-sealable sheet material, the first layer extending laterally beyond an edge of the second, comprising continuously feeding said layers in longitudinal direction, folding the first layer to draw the edge thereof which was originally located outward of said edge of the second layer back from the edge of the second layer and to bring said edges substantially into alignment with the side margins of the layers in face-to-face contact and also to form gusset-forming portions one of which includes said side margins and the other of which is folded away from said side edges on the outside of said first layer to lie away from said side margins so that they are clear for heat sealing, heat sealing said side margins, and then folding said other gusset-forming portion outward to form a gusset.

References Cited in the file of this patent

UNITED STATES PATENTS

| 2,067,646 | Potdevin | Jan. 12, 1937 |
| 2,401,109 | Rohdin | May 28, 1946 |